(12) United States Patent
Ohhashi (10) Patent No.: US 11,012,580 B2
(45) Date of Patent: May 18, 2021

(54) IMAGE PROCESSING APPARATUS AND AN INFORMATION PROCESSING SYSTEM FOR CHANGING A PROCESSING REQUEST

(71) Applicant: Hideki Ohhashi, Kanagawa (JP)

(72) Inventor: Hideki Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 175 days.

(21) Appl. No.: 16/289,979

(22) Filed: Mar. 1, 2019

(65) Prior Publication Data

US 2019/0273829 A1 Sep. 5, 2019

(30) Foreign Application Priority Data

Mar. 2, 2018 (JP) .............................. JP2018-037925

(51) Int. Cl.
*H04N 1/00* (2006.01)
*G06F 3/12* (2006.01)
*H04L 29/08* (2006.01)

(52) U.S. Cl.
CPC ....... *H04N 1/00228* (2013.01); *G06F 3/1203* (2013.01); *G06F 3/1255* (2013.01); *H04L 67/02* (2013.01); *H04N 1/00217* (2013.01)

(58) Field of Classification Search
None
See application file for complete search history.

(56) References Cited

U.S. PATENT DOCUMENTS

| 8,635,633 | B2 | 1/2014 | Ohhashi et al. | |
| 8,763,017 | B2 | 6/2014 | Ohhashi | |
| 9,384,041 | B2 | 7/2016 | Ohhashi et al. | |
| 9,535,662 | B2 | 1/2017 | Ohhashi | |
| 9,959,130 | B2 | 5/2018 | Ohhashi et al. | |
| 10,181,016 | B2 | 1/2019 | Ohhashi et al. | |
| 2011/0279837 | A1* | 11/2011 | Muramatsu | G06F 3/1265 358/1.9 |
| 2013/0003116 | A1* | 1/2013 | Katoh | H04N 1/00347 358/1.15 |
| 2015/0355918 | A1 | 12/2015 | Ohhashi | |
| 2019/0095162 | A1* | 3/2019 | Sasaki | H04N 1/0044 |

FOREIGN PATENT DOCUMENTS

JP 2010-067231 A 3/2010

* cited by examiner

*Primary Examiner* — Fan Zhang
(74) *Attorney, Agent, or Firm* — Oblon, McClelland, Maier & Neustadt, L.L.P.

(57) ABSTRACT

An image processing apparatus comprises a memory and processing circuitry. The memory is configured to store first instructions for performing a first processing, the first instructions being associated with a first processing request. The processing circuitry is configured to receive a second processing request from another device, the second processing request being associated with second instructions, and a part of the second processing request being incompatible with the first processing request; generate a resolution request for resolving an incompatibility between the part of the second processing request and the first processing request; generate an adjusted second processing request by changing information included in the second processing request, according to the resolution request, so that the adjusted second processing request is compatible with the first processing request; and perform the first processing by executing the first instructions according to the adjusted second processing request.

16 Claims, 4 Drawing Sheets

IMAGE PROCESSING APPARATUS AND AN INFORMATION PROCESSING SYSTEM FOR CHANGING A PROCESSING REQUEST

CROSS-REFERENCE TO RELATED APPLICATIONS

This patent application is based on and claims priority pursuant to 35 U.S.C. § 119(a) to Japanese Patent Application No. 2018-037925 filed on Mar. 2, 2018, in the Japan Patent Office, the entire disclosure of which is hereby incorporated by reference herein.

BACKGROUND

Technical Field

The present application relates to an image processing apparatus and an information processing system for changing a processing request.

Description of the Related Art

In offices and other environments, digital services are provided by connecting a plurality of devices together via a network so that the devices may cooperate with one another.

For example, an image forming apparatus A stores a print job uploaded by a user. An image forming apparatus B receives an instruction from the user, the instruction indicating an execution request for a print job. In this case, the image forming apparatus B may function as a client and the image forming apparatus A may function as a server. The image forming apparatus B as the client performs the print job after acquiring the print job from the image forming apparatus A.

Between the above image forming apparatuses, the positions of the client and server are relative. Therefore, there is a possibility that the image forming apparatus A will function as the client, and the image forming apparatus B will function as the server.

As above described, in an environment in which plural devices cooperate, it is necessary for processing requests (for example, interface such as API (application program interface)) between the plurality of device to be compatible.

SUMMARY

An image processing apparatus in accordance with the present application comprises a memory and processing circuitry. The memory is configured to store first instructions for performing a first processing, the first instructions being associated with a first processing request. The processing circuitry is configured to receive a second processing request from another device, the second processing request being associated with second instructions, and a part of the second processing request being incompatible with the first processing request; generate a resolution request for resolving an incompatibility between the part of the second processing request and the first processing request; generate an adjusted second processing request by changing information included in the second processing request, according to the resolution request, so that the adjusted second processing request is compatible with the first processing request; and perform the first processing by executing the first instructions according to the adjusted second processing request.

An information processing system in accordance with the present application comprises a first device and a second device. The first device includes a first memory and processing circuitry. The second device includes a second memory. The first memory stores first instructions for performing a first processing, the first instructions being associated with a first processing request. The second memory storing second that are associated with a second processing request, a part the second processing request being incompatible with the first processing request. The processing circuitry is configured to receive the second processing request from the second device; generate a resolution request for resolving an incompatibility between the part of the second processing request and the first processing request; generate an adjusted second processing request by changing information included in the second processing request, according to the resolution request, so that the adjusted second processing request is compatible with the first processing request; and perform the first processing by executing the first instructions according to the adjusted second processing request.

An information processing method in accordance with the present application comprises storing, by a memory of an information processing apparatus, first instructions for performing a first processing, the first instructions being associated with a first processing request; receiving a second processing request from another device, the second processing request being associated with second instructions, and a part of the second processing request being incompatible with the first processing request; generating, by processing circuitry of the information processing apparatus, a resolution request for resolving an incompatibility between the part of the second processing request and the first processing request; generating, by the processing circuitry, an adjusted second processing request by changing information included in the second processing request, according to the resolution request, so that the adjusted second processing request is compatible with the first processing request; and perform, by the processing circuitry, the first processing by executing the first instructions according to the adjusted second processing request.

BRIEF DESCRIPTION OF THE DRAWINGS

A more complete appreciation of the disclosure and many of the attendant advantages and features thereof may be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 1:
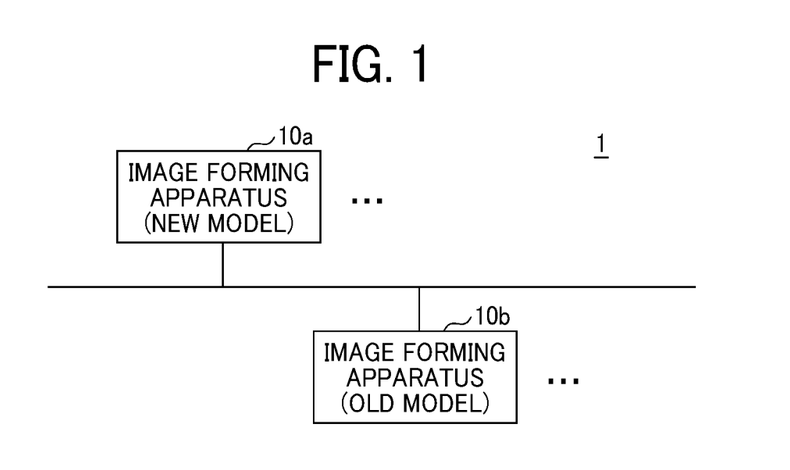
FIG. 1 is a diagram illustrating an exemplary configuration of an information processing system in accordance with the present application.

In the following, embodiments of the present application are described with reference to the accompanying drawings. In FIG. 1, the information processing system 1 includes one or more image forming apparatus 10a and one or more image forming apparatus 10b. The image forming apparatus 10a may be a relatively newer model than the image forming apparatus 10b. In other words, image forming apparatus 10b may be a relatively older model than the image forming apparatus 10a. In the following, when it is not necessary to distinguish between the image forming apparatus 10a and the image forming apparatus 10b, they are simply called "image forming apparatus 10". Each image forming apparatus 10 is connected via a network such as LAN (Local Area Network) so that it may communicate with other image forming apparatus 10.

In exemplary implementations, a difference between an old and new model of image forming apparatus 10 is a difference between an old and new of an application platform and application installed in the image forming apparatus 10. The application platform is a set of instructions or a software application installed and/or stored in a memory of the image forming apparatus 10. In exemplary implementations, the application platform is called "SDK platform" as a matter of convenience. Therefore, a SDK platform which is newer than a SDK platform installed in image forming apparatus 10b is installed in the image forming apparatus 10a. "New" may mean that version is newer than another version, includes changes to the another version, or may mean that an architecture is new.

Hereinafter, a SDK platform installed in the image forming apparatus 10a is called "new SDK platform", and the SDK platform installed in the image forming apparatus 10b is called "old SDK platform".

Figure 2:
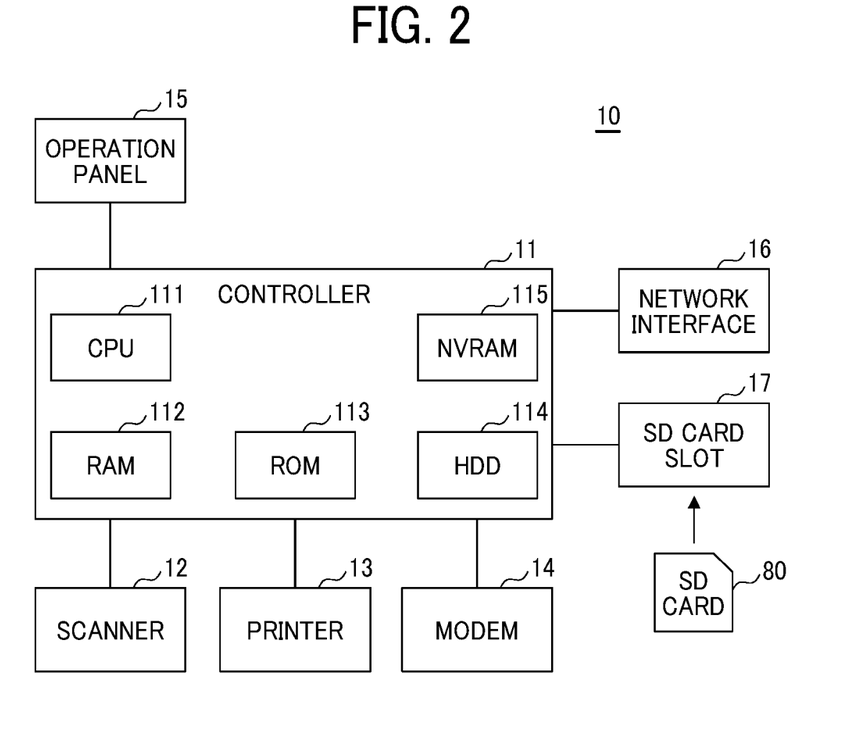
FIG. 2 is a diagram illustrating an exemplary hardware configuration of an image forming apparatus in accordance with the present application.

FIG. 2 is a diagram illustrating an exemplary hardware configuration of an image forming apparatus 10 in accordance with the present application. In particular, FIG. 2 illustrates that the image forming apparatus 10 may include hardware such as a controller 11, a scanner 12, a printer 13, a modem 14, an operation panel 15, a network interface 16, and an SD card slot 17.

The controller 11 may include a CPU 111, a RAM 112, a ROM 113, an HDD 114, and an NVRAM 115. The ROM 113 stores various programs, and data used by the various programs. The RAM 112 is used as storage area for loading the program, and a work area of a loaded program. The CPU 111 implements various function by processing a program loaded in the RAM 112. The HDD 113 stores programs, and various data used by the programs. The NVRAM 115 stores various setting information.

CPU 111 may include modules, parts, circuits, processing circuitry and/or integrated circuits, all of which may be referred to as processing circuitry. The processing circuitry may include a general-purpose processor, and the processing circuitry may include any number of processors, controllers, micro-controllers or state machines. Processing circuitry includes a programmed processor, such as a processor that includes circuitry. A processing circuit also includes devices such as an application specific integrated circuit (ASIC), digital signal processor (DSP), field programmable gate array (FPGA), and conventional circuit components arranged to perform functions.

Moreover, each image forming apparatus 10 is controlled by the processing circuitry. The processing circuitry may execute processing according to instructions and/or software stored in a memory, such as any of CPU 111, a RAM 112, a ROM 113, an HDD 114, and an NVRAM 115. The processing executed by image forming apparatus 10, as will be discussed in this application, may be according to instructions that are stored on a computer-readable storage medium such as a compact disc read only memory (CD-ROM) a flexible disk (FD), CD-R, DVD (Digital Versatile Disk), and/or USB (Universal Serial Bus). Furthermore, the processing executed by image forming apparatus 10 may be according to instructions that are provided via a network such as the Internet.

The scanner 12 is hardware (image reading unit) component for generating image data from a physical document by scanning the physical document. The printer 13 is hardware (printing unit) for printing print data on printing paper or some other recording medium. The modem 14 is hardware for connecting to a telephone line, and is used for transmitting and receiving of image data by facsimile or other digital type of communication. The operation panel 15 is hardware including input unit such as buttons for accepting input from the user, a display to output images to the user. The display may be a liquid crystal panel that may include a touch panel function. In this case, the liquid crystal panel has function of input unit. The network interface 16 is hardware for connecting to a network such as a local area network (LAN) that is wired or wireless. The SD card slot 17 is used for reading the program or instructions stored in the SD card 80. Namely, in the image forming apparatus 10, not only a program or instructions stored in the ROM 113 but also the program or instructions stored in the SD card 80 may be loaded into the RAM 112 and executed. Furthermore, the SD card 80 may be replaced with another recording medium (for example, a CD-ROM or a USB (Universal Serial Bus), and memory). That is, a type of recording medium corresponding to the SD card 80 is not limited to a predetermined medium. In this case, the SD card slot 17 may be replaced by hardware corresponding to the type of the recording medium.

In addition, a performance and specification of each hardware of image forming apparatus 10a and the image forming apparatus 10b may be different. Moreover, in the range not shown, the hardware configuration of the image forming apparatus 10a and image forming apparatus 10b may be different.

Figure 3:
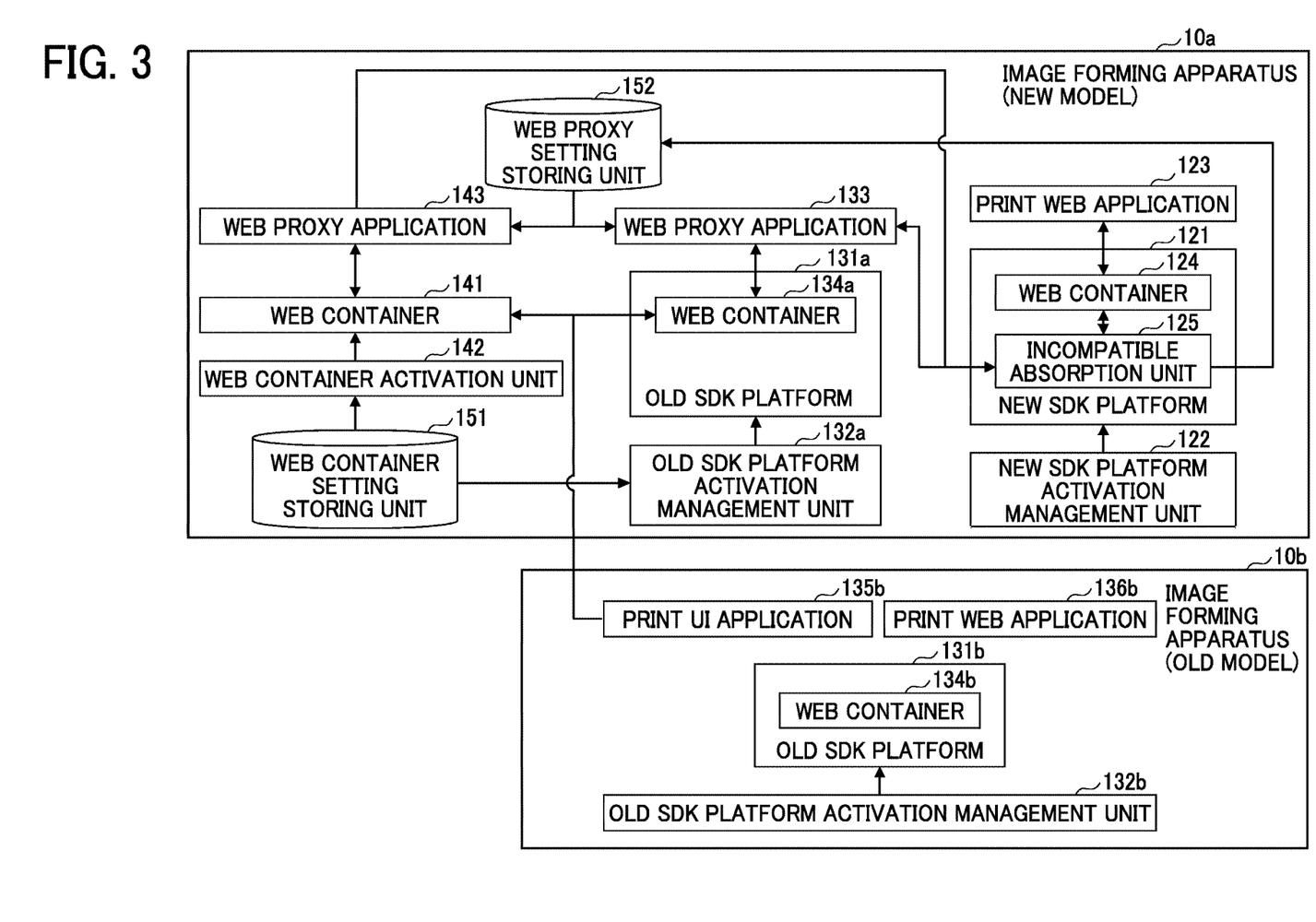
FIG. 3 is a diagram illustrating an exemplary configuration of an image forming apparatus in accordance with the present application.

FIG. 3 is a diagram illustrating an exemplary configuration of the image forming apparatus 10 in accordance with the present application. In accordance with FIG. 3, processing circuitry of the image forming apparatus 10a is configured to perform functionality to execute a new SDK platform 121, a print web application 123, a new SDK platform activation management unit 122, and old SDK platform 131a, an old SDK platform activation management unit 132a, a web proxy application 133, a web container 141, a web proxy application 143, and a web container activation unit 142. That is, the components of the image forming apparatus 10a are implemented according to instructions stored in a memory and that are executed by the processing circuitry. Furthermore, the image forming apparatus 10a may function to include a web container setting storing unit 151 and a web proxy setting storing unit 152, which are implemented by using HDD 114 or NVRAM 115 or the like.

For a port number, a URL, and/or another identifier, a web application such as a servlet running on the new SDK platform (hereinafter, called "new web application") is not compatible with the a web application such as a servlet running on the old SDK platform (hereinafter, called "old web application"). In such instances, the image forming apparatus 10a cannot accept a HTTP request from the image forming apparatus 10b. In order to accept the HTTP request from the image forming apparatus 10b, the image forming apparatus 10a has the old SDK platform 131a, the old SDK platform activation management unit 132a, the Web proxy application 133, the Web container 141, the Web proxy application 143, and the Web container activation unit 142.

The new SDK platform 121 and the old SDK platform 131 may perform a control installation, activation, termination, and uninstallation of each SDK application such as a UI application using the Web application and the operation panel 15.

The old SDK platform 131a includes a web container 134a. The web container 134a is a general web container. The web container 134a is activated when the old SDK platform 131a is activated. A general web container is a web container functioning as an execution environment of a web application. Specifically, a general web container receives an HTTP request, calls a method of a web application corresponding to the received HTTP request, and performs the like.

In exemplary implementations, the web proxy application 133 operates on the web container 134a. The web proxy application 133 is an example of an old web application. The web proxy application 133 forwards (sends) the HTTP request, which is a request to resolve an incompatible part of HTTP request, from client (image forming apparatus 10b) to the incompatible absorption unit 125 on the new SDK platform 121. A forward target URL and a forward destination URL (a URL corresponding to the a request resolving incompatible part) are acquired from the Web proxy setting storing unit 152.

The Web proxy setting storing unit 152 stores the forward target URL and the forward destination URL in association with each other. Therefore, a correspondence relationship between the forward target URL and the forward destination URL is stored in the Web proxy setting storing unit 152.

The old platform activation management unit 132a performs activation and termination of the old SDK platform 131a, and management of the activation state. The old SDK platform activation unit 132a refers to the setting information of automatic activation of the old SDK platform 131a (hereinafter, called "SDK activation setting information"). In the case which the automatic activation is enabled in the SDK activation setting information, the old SDK platform activation management unit 132a activate the old SDK platform 131a automatically such as when the image forming apparatus 10b is activated. The SDK activation setting information is stored in the HDD in the HDD 114, the NVRAM 115, or the like. The old SDK platform activation management unit 132a also returns the activation status of the old SDK platform 131a and the contents of the SDK activation setting information in response to an inquiry from another module. The old SDK platform activation management unit 132a may also send an activation notification of the old SDK platform 131a to each module.

The web container activating unit 142 controls activation of the web container 141. The web container activating unit 142 inquires of the old SDK platform activation management unit 132a about the SDK activation setting information. If the automatic activation setting of the old SDK platform 131a is invalid, the web container activation unit 142 activates the web container 141. In addition, when the Web container activation unit 142 detects activation of the old SDK platform 131a by such as notification from the old SDK activation management unit 132a during the activation of the web container 141, the web container activation unit 142 promptly shuts down the web container 141, and releases port and URL of the web container 141 and other system resources. Altogether, the web container 141 is activated when the old SDK platform 131a is not activated.

However, the web container 141 is not always activated when the old SDK platform 131a is not activated. Whether or not the web container 141 is activated depends on the information stored in the web container setting storing unit 151. That is, the information stored in the web container setting storing unit 151 indicates the necessity of activating the web container 141.

The web container 141 is a general web container like the web container 134a. In this embodiment, the web proxy application 143 operates on the web container 141. The web proxy application 143 has the same function as the web proxy application 133.

The new SDK platform 121 is an application platform operable in the image forming apparatus 10a of the new model. The new SDK platform 121 may operate on a CPU different from the old SDK platform 131a. For example, in the case which the operation panel 15 is an information processing terminal such as a tablet terminal, the new SDK platform 121 may be an application platform operating on the operation panel 15.

In FIG. 3, the new SDK platform 121 includes a web container 124 and an incompatible absorption unit 125. The web container 124 is a general web container like the web container 134a and is activated when the new SDK platform 121 is activated.

In FIG. 3, a print web application 123 is shown as an example of a new web application that may be installed in the image forming apparatus 10a and operates on the web container 124.

In response to a HTTP request (a request of absorbing incompatibility) sent via the web proxy application 133 or the web proxy application 143, the incompatible absorption unit 125 performs process to absorb the incompatibility between a web application interface operating on the new SDK platform 121 and a web application interface operating on the old SDK platform 131a.

The incompatible absorption unit 125 may not be a part of the new SDK platform 121. For example, the incompatible absorption unit 125 may be a single web application or may be included by each web application on the new SDK platform 121.

The new SDK platform activation management unit 122 performs the same process as the old SDK activation management unit, the same process is replaced the old platform 131b with the new SDK platform 121.

A port number and a URL path that is published by the web application depend on a setting and implementation of the web container. In this embodiment, a port number of the web container 124 is 80, a URL path of the web container 124 starts with "/SmartSDK/", a port number of the web container 134a and the web container 141 are 8080, a URL path of the web container 134a and the web container 141 start with "/LegacySDK/".

On the other hand, the image forming apparatus 10b includes an old SDK platform 131b, an old SDK platform activation management unit 132b, a print web application 136b, and a print UI application 135b. In addition, the old SDK platform 131b includes a web container 134b.

The old SDK platform 131b, the old SDK platform activation management unit 132b, and the web container 134b have respectively the same functions as the old SDK platform 131a, the old SDK platform activation management unit 132a, and the web container 134a in the image forming apparatus 10a.

The print web application 136b is a web application for print which operates on the old SDK platform 131a. The print web application 136b may be installed in the image forming apparatus 10b. Altogether, the print web application 136b is a web application that operates on the old SDK platform, which corresponds to the print web application 123.

The print UI application 135b is an SDK application that provides a user interface to the print web application 136b.

In an exemplary implementation of the present application, image forming apparatus 10a is may perform a processing (such as printing, scanning or transmitting a document) instead of another image forming apparatus 10b when image forming apparatus 10b receives a processing request from a user. In the case of a print processing request received by image forming apparatus 10b from the user, image forming apparatus 10b transmits the print request to image forming apparatus 10a and image forming apparatus 10a performs a processing to print the document. Moreover, image forming apparatus 10a may performing a processing to transmit a document (stored by image forming apparatus 10a) to image forming apparatus 10b when image forming apparatus 10a receives a request from image forming apparatus 10b. Further, image forming apparatus 10a may perform a processing to scan a document after receiving a scanning request from image forming apparatus 10b (the document may be stored by image forming apparatus 10a or transmitted from image forming apparatus 10a to image forming apparatus 10b).

Figure 4:
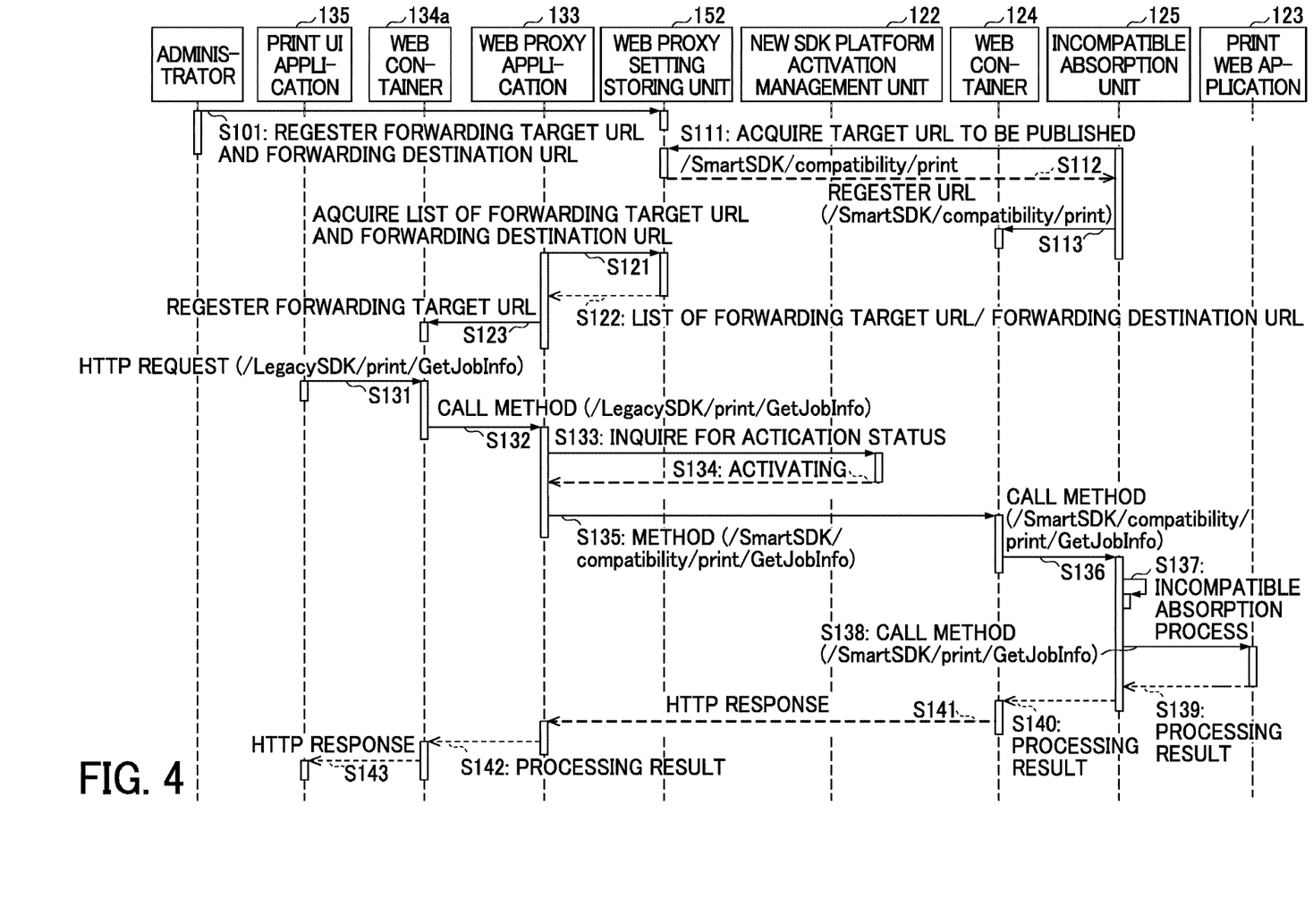
FIG. 4 is a diagram illustrating an exemplary process performed by an image forming apparatus in accordance with the present application.

A processing procedure executed by the image forming apparatus 10a will be described below. FIG. 4 is a diagram illustrating an exemplary process sequence performed by the image forming apparatus in accordance with the present application.

For example, settings of a forward target URL and a forward destination URL (hereinafter called "proxy setting") is registered in the web proxy setting storage unit 152 by a setting operation by an administrator or the like (S101). For example, the following settings are registered in the Web proxy setting storage unit 152.

[Forward target URL] (IP address)/Legacy SDK/print/*:8080

[Forward destination URL] (IP address)/SmartSDK/compatibility/print/*:80

As described above, a wild card such as "*" may be designated as the proxy setting. In the case which the IP addresses of the forward target URL and the forward destination URL are common, the IP address may be omitted.

Furthermore, a plurality of sets of forward target URL and forward destination URL may be included in the proxy setting. Without using wild card, the forward target URL and the forward destination URL may be designated such as below.

[Forward target URL] (IP address)/LegacySDK/print/:8080

[Forward destination URL] (IP address)/SmartSDK/compatibility/print/:80

When the forward target URL and the forward destination URL are designated such as above, The forward destination URL is determined by prefix search and port number much.

Furthermore, the forward target URL may be designated by regular expression.

In the case which the proxy setting is set as described above, for example, a HTTP request of which URL is "/LegacySDK/print/GetJobInfo:8080" is forwarded to "/SmartSDK/compatibility/print/GetJobInfo:80". Likewise, a HTTP request whose URL is "/LegacySDK/print/PostJobData:8080" is forwarded to "/SmartSDK/compatibility/print/PostJobData:80".

Above-mentioned "/SmartSDK/compatibility/print/GetJobInfo:80" is a URL corresponding to incompatibility resolution request (absorption request) relating to "GetJobInfo"."/SmartSDK/compatibility/print/GetJobInfo:80" corresponds to "/SmartSDK/print/GetJobInfo:8080" which is the URL published by the printing Web application 123, and "GetJobInfo"."/SmartSDK/compatibility/print/GetJobInfo:80" is published by the incompatible absorbing unit 125. Furthermore, "/SmartSDK/compatibility/print/PostJobData:80" is a URL corresponding to incompatibility resolution request (absorption request) relating to "PostJobData"."/SmartSDK/compatibility/print/PostJobData:80" corresponds to "/SmartSDK/print/PostJobData:80" which is the URL published by the printing web application 123, and "PostJobData"."/SmartSDK/compatibility/print/PostJobData:80" is published by the incompatible absorption unit 125. The proxy setting may be performed via the operation panel 15 of the image forming apparatus 10a or may be performed remotely via the network.

Thereafter, after the new SDK platform activation manager 122 activates the new SDK platform 121, the web container 124 is activated, and the print web application 123 and the incompatible absorption unit 125 are activated. In response to the above activations, the incompatible absorption unit 125 acquires a URL (a URL corresponding to an incompatibility resolution request) published by the incompatible absorption unit 125 from the web proxy setting storage unit 152 (S111, S112), and registers the acquired URL as a published URL list in the web container 124 (S113). The forward destination URL from the URLs stored in the web proxy setting storage unit 152 corresponds to the URL published by the incompatible absorption unit 125. Therefore, the incompatible absorption unit 125 acquires a list of forward destination URLs from the web proxy setting storage unit 152. However, the URL published by the incompatible absorption unit 125 may be stored in the storage area managed by the incompatible absorption unit 125, not the web proxy setting storage unit 152. In addition, the print web application 123 also registers the URL published by itself in the web container 124 like a general web application.

Furthermore, when activating the web container 134a, the web proxy application 133 acquires a list of pairs of the forward target URL and the forward destination URL from the web proxy setting storage unit 152 (S121, S122). Subsequently, the web proxy application 133 registers the forward target URL included in the acquired list as the URL corresponding to the Web proxy application 133 in the Web container 134a (S123). As a result, the web container 134a may recognize that the web application corresponding to the forward target URL is the web proxy application 133.

Thereafter, when receiving a HTTP request (hereinafter called "target request") according to interface specification of the old model of the print UI application 135b of the image forming apparatus 10b of the old model, the web container 134a calls a method corresponding a method of target request (a GET method, a POST method, etc.) from methods (doGET, doPOST, etc.). which a web application corresponding to the URL of target request. The Web application corresponding to the URL of the target request is a Web application that registered the URL in the Web container 134a. Therefore, if the URL of the target request is one of the forward target URLs, the method (doGet, doPost, etc.) of the Web proxy application 133 is called (S132). As the parameter of the method, information including the URL of the target request, and a content of the target request is specified.

In response to calling the method, the web proxy application 133 inquires of the new SDK platform activation management unit 122 about the activation state of the Web container 124 of the new SDK platform 121 (S133, S134). Furthermore, the new SDK platform activation management unit 122 activates the new SDK platform 121 at the time of such as activation of the image forming apparatus 10. Therefore, as the new SDK platform activation management unit 122 manages whether the web container 124 included in the new SDK platform 121 and the new SDK platform 121 has been normally activated, the new SDK platform activation management unit 122 may respond to the inquiry of the activation state of the web container 124.

If the web container 124 is not activated, the web proxy application 133 returns an HTTP response including a 500 series or 400 series error code to the client via the web container 134a. This is to prevent waiting until the request times out in the case which the web container 124 is not activated.

On the other hand, if the web container 124 is running, the web proxy application 133 sets destination to an HTTP request which includes a method (GET method, POST method, etc.) corresponding to the called method and is associated as a forwarding destination URL against a target request, and generates a HTTP request (hereinafter called "forward request") whose URL is a URI of the method, sends the forward request to the web container 124 corresponding to port number (80) of the forward request. In addition, the contents of such as the method, the header are basically the same between the target request and the forward request, but they may be changed as necessary. Furthermore, the forward request substantially corresponds to an incompatibility resolution request.

After the web container 124 receive the forward request, the web container 124 calls a method (doGet, doPost, the like) corresponding to the method of the forward request among methods of the incompatible absorption unit 125 that registered s URL of the forward request (S136). Information including the URL of the forward request and a content of the forward request is specified as argument of the method.

In response to calling the method corresponding to the method of the forward request, the incompatible absorption unit 125 resolves (absorbs) incompatible parts between the print web application 136b on the old SDK platform 131a and the print web application 123 on the new SDK platform 121 (S137). For example, If the URL of the forward request is "/SmartSDK/compatibility/print/GetJobInfo:80" corresponding to "/SmartSDK/print/GetJobInfo:80" which is the API of the print web application 123 of the new SDK platform 121, and "/SmartSDK/print/GetJobInfo:80" which is the API of the print web application 123 of the new SDK platform 121 and "/LegacySDK/print/GetJobInfo:80" corresponding to the API in the print web application 136 b of the old SDK platform 131a 8080" have different parameters (excess or deficiency etc.). In this case, the incompatible absorption unit 125 changes the content of the forward request in order to be compatible with the API of the print Web application 123 of the new SDK platform 121. Specifically, when a new parameter is added to the API of the print Web application 123 of the new SDK platform 121, the incompatible absorption unit 125 may add the default value of the new parameter to the forward request. When a parameter that is unnecessary for the API of the print Web application 123 of the new SDK platform 121 is exist, the incompatible absorption unit 125 may delete the parameter.

Moreover, the incompatible absorption unit 125 calls a method corresponding to the method of the forward request whose incompatible part in the method of the forward request has been resolved (after changing the incompatible part) among the methods what the print web application 123 has (S138). As for an argument of the called method, Information including the URL of the API of the Web application corresponding to the URL of the forward request, and the content of the forward request is specified. As a result, the API of the Web application on the new SDK platform 121 which is unknown to the image forming apparatus 10b (the print UI application 135) is called. For example, if the URL of the forward request is "/SmartSDK/compatibility/print/GetJobInfo:80", the URL of the API of the web application corresponding to the URL of the forward request is "/SmartSDK/print/GetJobInfo:80". Namely, in the present embodiment, the URL of the API of the incompatible absorption unit 125 is the URL which is inserted "compatibility" after "SmartSDK" of the URL.

After that, the print web application 123 execute processing according to the called method and the argument specified in the method, and outputs the processing result to the incompatible absorption unit 125 (S139). The incompatible absorption unit 125 outputs the processing result to the web container 124 (S140). In addition, the incompatible absorption unit 125 may execute processing for resolving (absorbing) the incompatible part of the processing result. For example, when the data format of the processing result is incompatible, the incompatible absorption unit 125 may change the data format of processing result to a data format which image forming apparatus 10b (print UI application 135) requires.

Subsequently, the web container 124 returns an HTTP response including the processing result (when incompatibility is absorbed, the processing result which absorbed incompatible) to the web proxy application 133 that sent the forward request (S141). The Web proxy application 133 outputs the processing result included in the HTTP response to the Web container 134a (S142). The web container 134a returns an HTTP response including the processing result to the image forming apparatus 10b (print UI application 135) which transmitted the target request (S143). As a result, the image forming apparatus 10b may execute processing like the image forming apparatus 10a is compatible with the image forming apparatus 10b (the print UI application 135).

In the above embodiment, incompatibility of parameters is absorbed by using the incompatible absorbing unit 125, but if the printing Web application 136b of the old SDK platform 131a and the printing Web application 123 of the new SDK application differ only URL and have the same parameters, the web container 124 may call the method of the print web application 123 in response to the HTTP request from the web proxy application 133. In this case, in the Web proxy setting storage unit 152, the URL disclosed by the print Web application 123 is set as the forward destination URL.

In FIG. 4, the Web proxy application 133 transmits the forward request corresponding to the target request to the forward destination. However, The Web proxy application 133 may return an HTTP response including a redirection instruction to the forward destination to the image forming apparatus 10b (print UI application 135) which transmitted the target request.

For example, the Web proxy application 133 returns an HTTP response as follows.

HTTP response code: 302
Location: /SmartSDK/print/GetJobInfo:80

The print UI application 135 redirects to the location destination according to the HTTP response. Subsequently, step S136 and the following steps are executed.

However, in this case, the image forming apparatus 10b needs to be able to interpret the response of redirection.

Moreover, whether the web proxy application 133 forwards or redirects may be set externally (by the user). For example, information indicating whether the web proxy application 133 forwards or redirects may be stored in the web proxy setting storage unit 152. In this case, by referring to the information, the web proxy application 133 decides whether to transmit the forward request to the Web container 124 or the redirection instruction to the client (image forming apparatus 10b).

In FIG. 4, a print web application has been described as an example of a Web application. However, this embodiment is also effective for incompatible absorption of web applications related to other functions, such as scan web application. By editing the stored information of the web proxy setting storage unit 152, the available web application may be easily changed.

Furthermore, Further, the web proxy application 133 may be a function embedded in the old SDK platform 131a, instead of a web application.

In FIG. 4, a case which the web container 134a is activated is shown. However, when the web container 134a is not activated and the web container 141 is activated, the processing executed by the web container 134a and the web proxy application 133 in FIG. 4 is executed by the web container 141 and the web proxy application 143.

Figure 5:
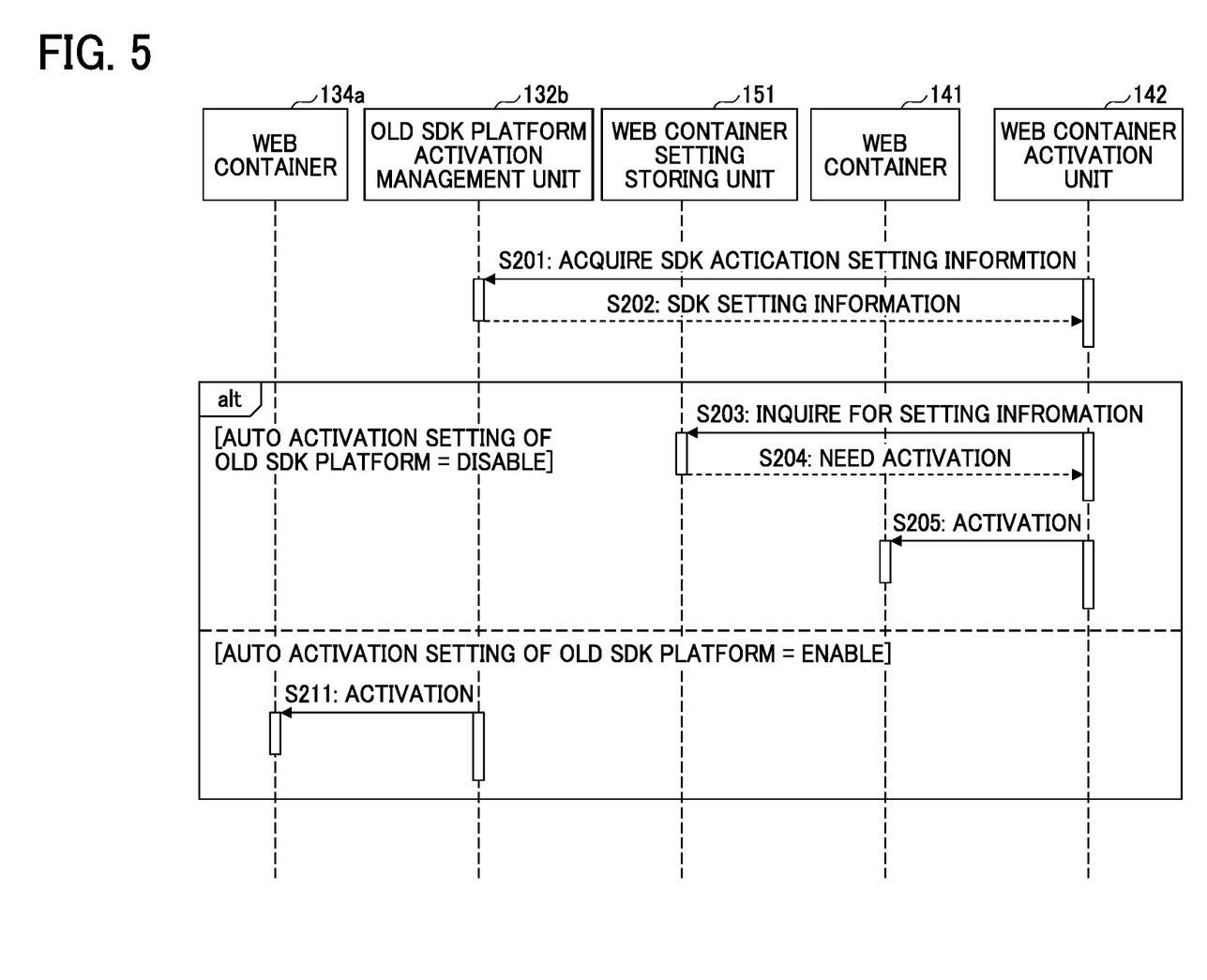
FIG. 5 is a diagram illustrating an exemplary activation process of a web container in accordance with the present application.

Next, A method of determining the web container to be activated will be described below. FIG. 5 is a sequence diagram illustrating an exemplary a process sequence of activation process of a web container according to an embodiment of the present invention. For example, the processing procedure in FIG. 5 is performed at the time of activation of the image forming apparatus 10a or the like.

First, the web container activation unit 142 acquires SDK activation setting information from the old SDK platform activation management unit 132a (S 201, S 202). The SDK activation setting information is information indicating whether automatic activation of the old SDK platform 131a is valid or invalid. System resources such as ports and URLs need to be set so as not to conflict with multiple modules in the system. However, if automatic activation of the old SDK platform 131a is invalid, the web container 134a will not be activated. Therefore, the web container 141 may be activated. However, whether or not to activate the web container 141 depends on the setting information in the web container setting storage unit 151. The reason is to avoid opening port which are not used from the viewpoint of security, when the old model disappears from the market, all the devices are shifted to the new model, and the web container 134a and the web container 141 are no longer needed. In addition, the setting in the web container setting storage unit 151 may be set and changed from remote via a network.

When the automatic activation setting of the old SDK platform 131a is invalid, the web container activating unit 142 refers to the setting of the web container setting storage unit 151 (S 203, S 204). When the setting of the web container setting storage unit 151 indicate that activation of the web container 141 is necessary, the web container activating unit 142 activates the web container 141 (S 205). When the setting contents indicate that activation of the web container 141 is not necessary, the web container activating unit 142 does not activate the web container 141.

On the other hand, when the automatic activation setting of the old SDK platform 131a is valid, the old SDK platform start management section 132a activates the web container 134a (S211). Concretely, when the old SDK platform activation management unit 132a activates the old SDK platform 131a, the web container 134a is activated.

When the automatic activation setting of the old SDK platform 131a is invalid, there is a possibility that the old SDK platform 131a is activated by a user (administrator etc.) at an arbitrary timing of the user after activating the image forming apparatus 10a. in this case, the SDK platform activation management unit 132a notifies all module (or registered module) that the SDK platform 131 has been activated. The all module includes the Web container activation unit 142. When the Web container activation unit 142 receive the notification, the Web container activation unit 142 may quickly release system resource like a port of the Web container 141, and the web container 134a of the old SDK platform 131a may be activated.

According to the processing procedure illustrated in FIG. 5, even if the old SDK platform 131a is uninstalled in the future or the automatic activation setting of the old SDK platform 131a is set invalid, since the web container 141 is activated, the image forming apparatus 10a may receive the HTTP request from the old model.

In the present embodiment, the image forming apparatus is an example as a device. However, an example as a device may be a projector, an electronic blackboard, a video conference system, or the like.

As described above, according to the present embodiment, even if the image forming apparatus 10a receive a processing request (HTTP request) that is incompatible with the image forming apparatus 10a, by using the web proxy application 133 or the web proxy application 143 and the incompatible absorption unit 125, the web application 123 may receive the processing request after absorbing incompatible part of the processing request. Therefore, according to the present embodiment, a device may cooperation with another device that has incompatible with the device.

Furthermore, according to the present embodiment, even if an interface of the device change by great design change of a software (for example, application platform) installed in the device, and a compatibility between new model and old model is lost, the devices which are different type of model may cooperate to perform processing.

Moreover, according to the present embodiment, in devices installed in places such as an office, even if only some devices are replaced with new models, and devices that does not have incompatibility each other is exist in an environment, the replaced devices may be ensured that the replaced device may cooperate with another device including old model, and the user may use the service that was possible before replacing the devices.

In this embodiment, the print web application 136b is an example of a first program, first processing or first instructions executed by processing circuitry of an image processing apparatus. The print web application 123 is an example of a second program, first processing or first instructions executed by processing circuitry executed by an image processing apparatus. "/LegacySDK/print/*:8080" is an example of a first processing request. "/SmartSDK/print/:8080" is an example of a second processing request. "/SmartSDK/compatibility/print/:80" is an example of an absorption request. The web container 134a or the web container 141 are an example of a receiving unit. The web proxy application 133 or the web proxy application 143 is an example of a generation unit. The incompatible absorption unit 125 is an example of a convert unit. The image forming apparatus 10b is an example of a first device. The image forming apparatus 10a is an example of a second device.

As described above, Although the embodiments and the variations of the present invention, the present invention is not limited to the above described embodiments and variations. The components may be modified and realized. In addition, combination of elements of the embodiments and the variations may form variations invention. For example, some constituent elements may be deleted from all the constituent elements illustrated in the embodiments and the variations. Any one of the above-described operations may be performed in variations other ways, for example, in an order different from the one described above.

The invention claimed is:

1. An image processing apparatus, comprising:
a memory configured to store first instructions for performing a first processing, the first instructions being associated with a first processing request; and
processing circuitry configured to
receive a second processing request from another device, the second processing request being associated with second instructions, and a part of the second processing request being incompatible with the first processing request;
generate a resolution request for resolving an incompatibility between the part of the second processing request and the first processing request;
generate an adjusted second processing request by changing information included in the second processing request, according to the resolution request, so that the adjusted second processing request is compatible with the first processing request; and
perform the first processing by executing the first instructions according to the adjusted second processing request,
wherein the memory is further configured to store a plurality of pieces of the information; and
the processing circuitry is further configured to
generate the resolution request based on the plurality of pieces of the information;
generate a redirection instruction of the resolution request;
send the redirection instruction to a transmission source of the second processing request; and
change the information included in the adjusted second processing request in response to another resolution request sent from the transmission source, the another resolution request having been sent from the transmission source in response to the redirection instruction.

2. The image processing apparatus of claim 1, wherein the part of the second processing request is a parameter included in the first processing request.

3. The image processing apparatus of claim 1, wherein the first processing request and the second processing request are HTTP requests.

4. The image processing apparatus of claim 1, wherein the processing circuitry is further configured to generate the redirection instruction when information indicating the redirection instruction is stored in the memory.

5. The image processing apparatus of claim 1, wherein to perform the first processing, the processing circuitry is further configured to control a printer to print a document according to the adjusted second processing request.

6. The image processing apparatus of claim 1, wherein to perform the first processing, the processing circuitry is further configured to control a scanner to scan a document according to the adjusted second processing request.

7. The image processing apparatus of claim 6, where the processing circuitry is further configured to:
generate an electronic document according to the scan of the document; and
transmit the electronic document to the another device.

8. An information processing system, comprising:
a first device including a first memory and processing circuitry; and
a second device including a second memory, wherein
the first memory stores first instructions for performing a first processing, the first instructions being associated with a first processing request,
the second memory storing second instructions that are associated with a second processing request, a part the second processing request being incompatible with the first processing request, and
the processing circuitry is configured to
receive the second processing request from the second device;
generate a resolution request for resolving an incompatibility between the part of the second processing request and the first processing request;
generate an adjusted second processing request by changing information included in the second processing request, according to the resolution request, so that the adjusted second processing request is compatible with the first processing request; and
perform the first processing by executing the first instructions according to the adjusted second processing request, wherein
the first memory is configured to store a plurality of pieces of the information; and
the processing circuitry is further configured to
generate the resolution request based on the plurality of pieces of the information;
generate a redirection instruction of the resolution request;
send the redirection instruction to a transmission source of the second processing request; and
change the information included in the adjusted second processing request in response to another resolution request sent from the transmission source, the another resolution request having been sent from the transmission source in response to the redirection instruction.

9. The information processing system of claim 8, wherein the part of the second processing request is a parameter included in the first processing request.

10. The information processing system of claim 8, wherein the first processing request and the second processing request are HTTP requests.

11. The information processing system of claim 8, wherein to perform the first processing, the processing circuitry is further configured to control a printer to print a document according to the adjusted second processing request.

12. The information processing system of claim 8, wherein to perform the first processing, the processing circuitry is further configured to control a scanner to scan a document according to the adjusted second processing request.

13. The information processing system of claim 12, where the processing circuitry is further configured to:
  generate an electronic document according to the scan of the document; and
  transmit the electronic document to the second device.

14. An information processing method, comprising:
  storing, by a memory of an information processing apparatus, first instructions for performing a first processing, the first instructions being associated with a first processing request;
  receiving a second processing request from another device, the second processing request being associated with second instructions, and a part of the second processing request being incompatible with the first processing request;
  generating, by processing circuitry of the information processing apparatus, a resolution request for resolving an incompatibility between the part of the second processing request and the first processing request;
  generating, by the processing circuitry, an adjusted second processing request by changing information included in the second processing request, according to the resolution request, so that the adjusted second processing request is compatible with the first processing request; and
  performing, by the processing circuitry, the first processing by executing the first instructions according to the adjusted second processing request, wherein the method further includes
  storing by the memory, a plurality of pieces of the information;
  generating the resolution request based on the plurality of pieces of the information;
  generating a redirection instruction of the resolution request;
  sending the redirection instruction to a transmission source of the second processing request; and
  changing the information included in the adjusted second processing request in response to another resolution request sent from the transmission source, the another resolution request having been sent from the transmission source in response to the redirection instruction.

15. The information processing method of claim 14, wherein the first processing includes controlling a printer to print a document according to the adjusted second processing request.

16. The information processing method of claim 14, wherein the first processing includes:
  controlling a scanner to scan a document according to the adjusted second processing request;
  generating an electronic document according to the scan of the document; and
  transmitting the electronic document to the another device.

* * * * *